United States Patent
Parekh et al.

(10) Patent No.: US 8,361,432 B2
(45) Date of Patent: *Jan. 29, 2013

(54) REACTOR, A RETAINED CATALYST STRUCTURE, AND A METHOD FOR IMPROVING DECOMPOSITION OF POLYSULFIDES AND REMOVAL OF HYDROGEN SULFIDE IN LIQUID SULFUR

(75) Inventors: Uday Navin Parekh, Allentown, PA (US); Stephen Neal Fenderson, Gladewater, TX (US); Diwakar Garg, Emmaus, PA (US); Guglielmo Nasato, Oakville (CA)

(73) Assignee: Fluor Enterprises, Inc., Irving, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/962,712

(22) Filed: Dec. 8, 2010

(65) Prior Publication Data

US 2012/0148479 A1    Jun. 14, 2012

(51) Int. Cl.
- *B01J 10/00* (2006.01)
- *B01J 23/02* (2006.01)
- *B01J 23/745* (2006.01)
- *B01D 53/52* (2006.01)
- *C01B 17/02* (2006.01)

(52) U.S. Cl. .............. 423/578.1; 422/211; 502/439; 502/527.23; 502/527.24

(58) Field of Classification Search .......... 422/211; 423/578.1; 502/439, 527.23, 527.24
See application file for complete search history.

(56) References Cited

U.S. PATENT DOCUMENTS

| | | | |
|---|---|---|---|
| 4,729,887 A | 3/1988 | Pendergraft | |
| 5,338,465 A | 8/1994 | Lockhart et al. | |
| 5,632,967 A | 5/1997 | Nasato et al. | |
| 5,744,523 A | 4/1998 | Barkowsky et al. | |
| 6,010,677 A * | 1/2000 | Scheybeler | 423/567.1 |

(Continued)

FOREIGN PATENT DOCUMENTS

| | | |
|---|---|---|
| WO | 9833846 | 8/1998 |
| WO | 0148032 | 7/2001 |

OTHER PUBLICATIONS

Clark, P. D. et al; "A New Approach Towards Small Scale Sulfur Recovery and Liquid Sulfur Degassing" Presentation at the Laurance Reid Gas Conditioning Conference (2009-2010); pp. 351-264.

Garg et al; "Reactor, A Structure Packing, and a Method for Improving Oxidation of Hydrogen Sulfide or Polysulfides in Liquid Sulfur" U.S. Appl. No. 12/692,978, filed Jan. 25, 2010.

*Primary Examiner* — Timothy Vanoy
(74) *Attorney, Agent, or Firm* — Fish & Associates, PC

(57) ABSTRACT

Disclosed is a reactor, a retained catalyst structure, and a method for increasing the rate of decomposition of polysulfides and removal of hydrogen sulfide in liquid sulfur. The reactor, the retained catalyst structure, and the method include a retained catalyst structure arranged and disposed for contacting a first stream and a second stream in a reactor including a catalyst. The catalyst increases the rate of decomposition of polysulfides and facilitates the removal of hydrogen sulfide in the liquid sulfur of the first stream with the second stream. The first stream includes liquid sulfur containing polysulfides and dissolved hydrogen sulfide. The second stream includes an inert gas or a low oxygen-containing gas.

24 Claims, 3 Drawing Sheets

U.S. PATENT DOCUMENTS

| | | |
|---|---|---|
| 6,149,887 A | 11/2000 | Lagas et al. |
| 6,199,318 B1 | 3/2001 | Stewart et al. |
| 6,224,793 B1 | 5/2001 | Hoffman et al. |
| 6,255,367 B1 | 7/2001 | Bitler et al. |
| 6,265,360 B1 | 7/2001 | DeTar et al. |
| 6,353,068 B1 | 3/2002 | Dietz et al. |
| 6,540,984 B2 | 4/2003 | Stewart et al. |
| 6,831,116 B2 | 12/2004 | Bitler et al. |
| 6,989,417 B2 | 1/2006 | Bitler et al. |
| 2001/0018484 A1 | 8/2001 | Bitler et al. |
| 2001/0056164 A1 | 12/2001 | Duncum et al. |
| 2003/0147946 A1 | 8/2003 | Stewart et al. |
| 2004/0250465 A1 | 12/2004 | Deng et al. |
| 2006/0236597 A1 | 10/2006 | Deng et al. |

* cited by examiner

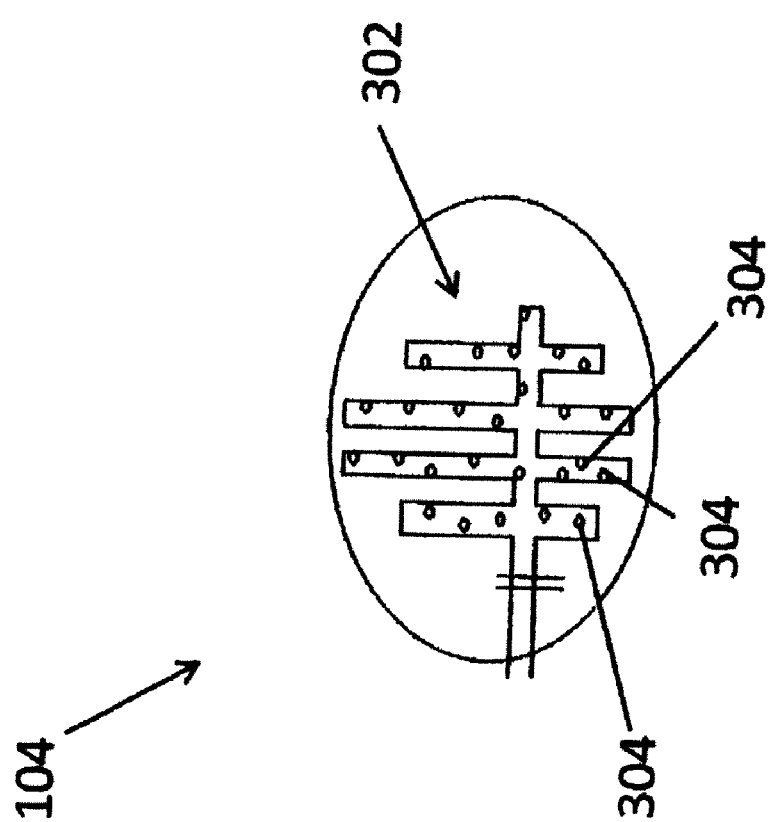

REACTOR, A RETAINED CATALYST STRUCTURE, AND A METHOD FOR IMPROVING DECOMPOSITION OF POLYSULFIDES AND REMOVAL OF HYDROGEN SULFIDE IN LIQUID SULFUR

BACKGROUND OF THE INVENTION

The present invention is directed to a reactor, a retained catalyst structure, and a method for improving decomposition of polysulfides and removal of hydrogen sulfide in liquid sulfur. More specifically, the reactor, the retained catalyst structure, and the method involve a catalyst for improving simultaneous decomposition of hydrogen polysulfides to hydrogen sulfide and removal of hydrogen sulfide with an inert gas or a low oxygen-containing inert gas.

Generally, the Claus process is used to recover sulfur from hazardous waste gas streams containing hydrogen sulfide gas produced during refining of petroleum products, natural gas processing and gasification. The Claus process involves partially combusting hydrogen sulfide in air, oxygen, or oxygen-enriched air to produce sulfur dioxide. Sulfur dioxide then reacts with remaining hydrogen sulfide to produce sulfur. Sulfur is recovered from the Claus process in a liquid form. Handling of the liquid sulfur produced from the Claus process can be difficult due to the polysulfides and dissolved hydrogen sulfide gas present therein. The polysulfides degrade slowly, thereby producing toxic, odorous and highly flammable hydrogen sulfide gas. A large portion of the hydrogen sulfide gas is retained by liquid sulfur as a dissolved gas. In untreated liquid sulfur, a small portion of the hydrogen sulfide gas is released slowly into the environment. The gradual degradation of the polysulfides and the release of the dissolved hydrogen sulfide gas during storage and transportation involve substantial health, safety and environmental risks and may result in fire. The toxicity of hydrogen sulfide involves substantial safety risks.

Known processes have been developed to mitigate issues with the gradual release of hydrogen sulfide gas. In general, the processes involve accelerated decomposition of polysulfides and removal of dissolved hydrogen sulfide from liquid sulfur.

One such process is captured in U.S. Pat. No. 4,729,887; hereby incorporated by reference. The U.S. Pat. No. 4,729,887 describes the conversion of hydrogen polysulfides to hydrogen sulfide from a liquid sulfur stream through liquid treatment by a solid particulate catalyst. The hydrogen sulfide is then removed from the liquid stream by a stripping gas. The stripping gas for use in the U.S. Pat. No. 4,729,887 is preferably a non-inert gas containing elemental oxygen or sulfur dioxide. In the U.S. Pat. No. 4,729,887 the liquid sulfur and stripping gas stream flow co-currently upflow through the solid catalyst treatment area. In concurrent flow the stripping gas and liquid sulfur have relatively low contact time with the solid catalyst, potentially requiring recycling the liquid sulfur stream through the solid catalyst many times to effectively convert hydrogen polysulfides and strip out the hydrogen sulfide. Furthermore, infusion of untreated liquid sulfur flow into the solid catalyst treatment area would need to be relatively low compared to the recycling treated liquid sulfur flow, so as to maintain the desired concentration of hydrogen sulfide in the treated liquid sulfur. The upflow configuration may also result in fluidizing the catalyst bed due to similar densities of liquid sulfur and catalyst, causing crushing of the catalyst and contaminating the treated liquid sulfur stream with fine catalyst particles.

A known process for mitigating these issues is described in U.S. Pat. No. 5,632,967, which is hereby incorporated by reference in its entirety. The U.S. Pat. No. 5,632,967 describes a first stream including liquid sulfur containing polysulfides and dissolved hydrogen sulfide and a second stream of oxygen-containing gas being contacted in a reactor (operated under pressure to increase oxygen partial pressure) packed with a mixing device. Specifically, the mixing device is submerged in the first stream including liquid sulfur and the second stream of oxygen-containing gas is bubbled into the first stream including liquid sulfur from the bottom of the reactor. The second stream of oxygen-containing gas oxidizes hydrogen sulfide and polysulfides present in the first stream including liquid sulfur to form sulfur and strip dissolved hydrogen sulfide from the liquid sulfur. The stripped hydrogen sulfide gas is removed from the top of the reactor along with any unused portions of the second stream of oxygen-containing gas. The stripped hydrogen sulfide gas and unused portions of the second stream of oxygen-containing gas may be recycled back to the Claus reactor. The treated first stream including liquid sulfur includes less than about 10 parts per million by weight (ppmw) of combined polysulfides and dissolved hydrogen sulfide gas. The treated first stream including liquid sulfur is removed from the bottom of the reactor, stored as a liquid or solidified, then provided to end users.

The process described in U.S. Pat. No. 5,632,967 may also involve a catalyst in a packed bed of spherical or pelletized catalyst. Catalytic oxidation of hydrogen sulfide and polysulfides in the U.S. Pat. No. 5,632,967 patent occurs when the first stream and the second stream contact in the packed bed. The oxygen containing stripping stream may react with liquid sulfur and dissolved $H_2S$, forming $SO_2$ and moisture. The process described in U.S. Pat. No. 5,632,967 does not include decreasing the combined polysulfides and hydrogen sulfide content in the liquid sulfur to less than 5 ppmw. To meet increased environmental restrictions, a decreased combined polysulfides and hydrogen sulfide content in the liquid sulfur is desired. In addition, improved energy efficiency and operational costs are also desired.

U.S. Pat. No. 6,149,887, which is hereby incorporated by reference in its entirety, discloses a method for removing hydrogen sulfide and hydrogen polysulfide compounds from liquid sulfur by stripping with a gas. U.S. Pat. No. 6,149,887 expressly suggests that use of a catalyst is disfavored. U.S. Pat. No. 6,149,887 suggests that introducing a catalyst to the liquid sulfur and, thereafter, stripping the catalyst from the sulfur can result in several drawbacks. This patent suggests that use of the catalyst may clog portions of the system and/or result in catalyst being present in the removed sulfur.

U.S. patent application Ser. No. 12/692,978, filed Jan. 25, 2010, entitled "A Reactor, a Structured Packing, and a Method for Improving Oxidation of Hydrogen Sulfide or Polysulfides in Liquid Sulfur", which is hereby incorporated by reference in its entirety, discloses a reactor including a first inlet for a first stream including liquid sulfur containing polysulfides and dissolved hydrogen sulfide, a second inlet for a second stream of oxygen-containing gas, and a structured packing for contacting the first stream and the second stream, the structured packing having a catalyst. The catalyst accelerates the rate of decomposition and oxidation of polysulfides and oxidation of hydrogen sulfide in the liquid sulfur of the first stream with the second stream.

In the Ser. No. 12/692,978 patent application, a catalyst coated packing is employed in order to achieve an accelerated decomposition of $H_2S_x$ to $H_2S$, and partial oxidation to elemental sulfur and $SO_2$ and oxidation of hydrogen sulfide to $SO_2$ and elemental sulfur. The converted $H_2S$ produced by decomposition of polysulfides is in turn oxidized to $SO_2$ and to elemental sulfur. Elemental sulfur is also produced by the reaction of $H_2S$ with $SO_2$. An unwanted product from the reaction of $H_2S$ and $O_2$ is $H_2O$, which could lead to corrosion of internal metal surfaces. The Ser. No. 12/692,978 patent application utilizes an oxygen containing stream at above atmospheric pressure.

A method and system for further decreasing combined polysulfides and hydrogen sulfide content in liquid sulfur, a method and system for decreasing combined polysulfides and hydrogen sulfide content in liquid sulfur utilizing inert or low oxygen-containing stream, and/or a method and system for decreasing combined polysulfides and hydrogen sulfide content in liquid sulfur capable of operation at low or high pressures having increased handling options for removed gases is desired in the art.

BRIEF SUMMARY OF THE INVENTION

This invention solves problems associated with conventional practices by providing a method and system for decomposing certain constituents of the liquid sulfur. The term "liquid sulfur" refers to a liquid phase or medium comprising about 20 ppmw to about 600 ppmw hydrogen sulfide and about 20 ppmw to about 600 ppmw polysulfides (e.g., $H_2S_x$) and trace level contaminants such as nitrogen sulfur compounds. The term "polysulfides" refers to at least one member selected from the group consisting of $H_2S_x$, where x is an integer equal to or greater than 2, and mixtures thereof.

One aspect of the present disclosure includes a reactor including a first inlet for a first stream including liquid sulfur containing polysulfides and dissolved hydrogen sulfide, a second inlet for a second stream of inert gas or a low oxygen-containing gas, and a retained catalyst structure arranged and disposed to facilitate contact between the first stream, the second stream, and the retained catalyst structure. The amount of catalyst is sufficient to increase the rate of decomposition of the polysulfides into hydrogen sulfide and facilitate the removal of hydrogen sulfide thus produced and originally present in the liquid sulfur of the first stream with the second stream.

Another aspect of the present disclosure includes a structured packing including a catalyst for contacting a first stream and a second stream in a reactor. The retained catalyst structure increases the rate of decomposition of the polysulfides into hydrogen sulfide and facilitates the removal of hydrogen sulfide thus produced and originally present in the liquid sulfur of the first stream with the second stream. The first stream includes liquid sulfur containing polysulfides and dissolved hydrogen sulfide. The second stream includes an inert gas or low oxygen-containing gas.

Another aspect of the present disclosure includes a method of removing hydrogen sulfide present in liquid sulfur and that produced by decomposing polysulfides present in liquid sulfur. The method includes providing a first stream including liquid sulfur containing polysulfides and dissolved hydrogen sulfide, providing a second stream of an inert gas or a low oxygen-containing gas. In a retained catalyst structure having a catalyst, the first stream and the second stream are contacted. The catalyst is sufficient to increase the rate of decomposition of polysulfides into $H_2S$ and facilitates the removal of hydrogen sulfide thus produced and originally present in the liquid sulfur of the first stream with the second stream.

In a further aspect of the invention, a retained catalyst structure having a catalyst coated packing is employed in order to achieve an accelerated decomposition of $H_2S_x$ to $H_2S$, and removal of hydrogen sulfide from liquid sulfur. The converted $H_2S$ produced by decomposition of polysulfides is in turn removed.

An advantage of certain embodiments of the present disclosure is that the use of an inert gas or a low oxygen-containing gas eliminates or decreases the formation of $H_2O$ and $SO_2$. The decreased formation of $H_2O$ and $SO_2$ reduces the corrosion of the contacting vessel as well as the transfer pipes.

Another advantage of certain embodiments of the present disclosure is that operational pressure as low as atmospheric pressure can be used for degassing liquid sulfur. The use of low pressure reduces the cost associated with compressing the inert gas or low-oxygen-containing inert gas.

Another advantage of certain embodiment of the present disclosure is that $H_2S$ gas mixed with an inert gas recovered from the degassing process can be separated and recycle back to the Claus process, thereby eliminating or greatly reducing the pollution of the environment by $H_2S$.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

FIG. 3 shows a gas diffuser according to an exemplary embodiment of the reactor.

DETAILED DESCRIPTION OF THE INVENTION

Provided is a method and system for further decreasing combined polysulfides and hydrogen sulfide content in liquid sulfur, having reduced corrosive by-products. Embodiments of the present disclosure reduce combined polysulfides and hydrogen sulfide content in liquid sulfur to levels desirable to meet environmental restrictions and produce fewer corrosive by-products by utilizing inert gas or a low oxygen-containing gas.

Figure 1:
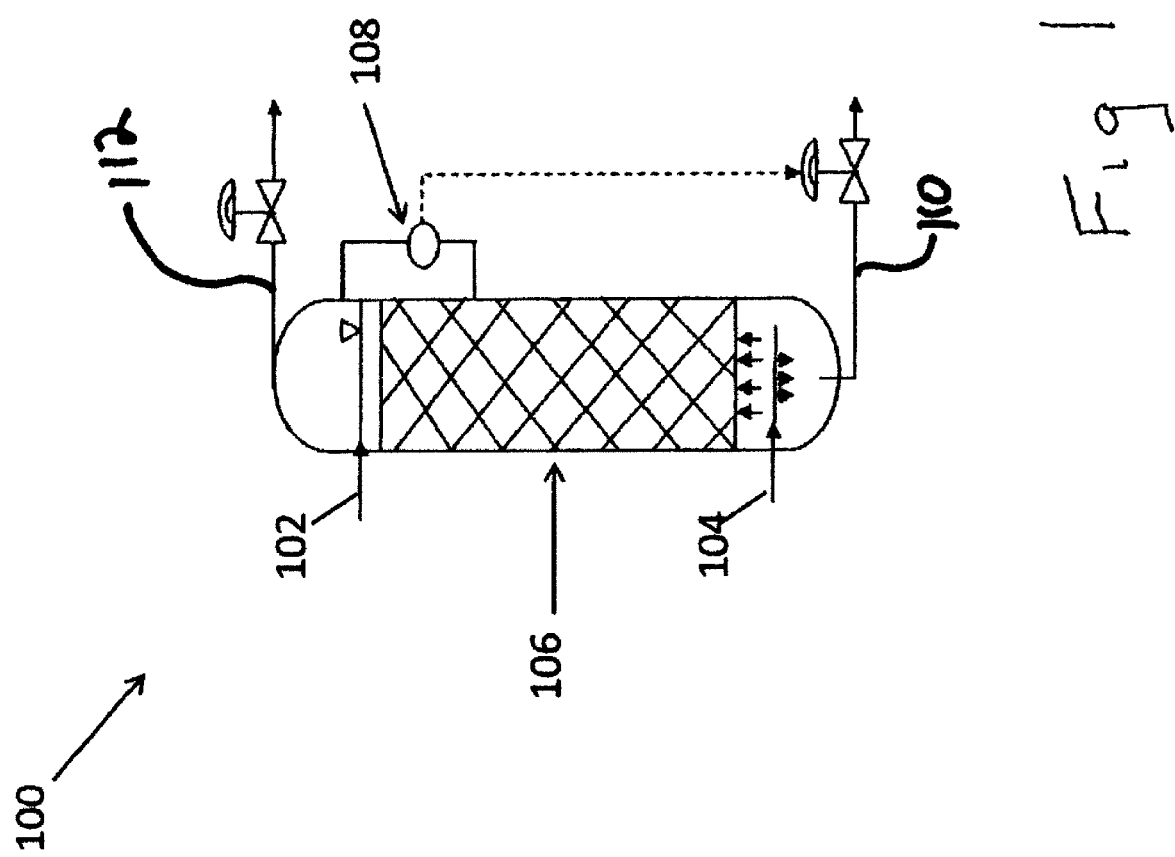
FIG. 1 shows an exemplary reactor according to an embodiment of the disclosure.

Referring to FIG. 1, an embodiment of the present disclosure includes a reactor 100 having a first inlet 102 for a first stream including liquid sulfur containing polysulfides and dissolved hydrogen sulfide, a second inlet 104 for a second stream of an inert gas or low oxygen-containing gas, and a region 106 for contacting the first stream and the second stream.

The reactor 100 can be made of any suitable material (for example, carbon steel or other materials inert to oxidizing gases, liquid sulfur, and/or moist hydrogen sulfide and sulfur dioxide gases). The reactor 100 can be operated under any suitable conditions and may be operated under low pressure or high pressure. In one embodiment, the reactor 100 may be operated at a pressure range of about 2 psig to 150 psig. A low range of operating pressure is typically used to minimize cost involved in compressing inert gas or low oxygen-containing gas. The operating pressure range may be established based upon the downstream handling of the removed gases from the top of the reactor.

As shown in FIG. 1, the first inlet 102 for the first stream including liquid sulfur containing polysulfides and dissolved hydrogen sulfide is positioned at the top of the reactor 100. However, alternate inlet positioning may be used. The first stream after being exposed to the second stream is removed from a sulfur outlet 110 at the bottom of the reactor 100, to be stored as a liquid or solidified, then provided to end users. The removed sulfur stream typically includes less than about 10 parts per million by weight (ppmw) of total polysulfides and dissolved hydrogen sulfide gas content. The first stream may be pumped into the reactor 100 from any suitable source of liquid sulfur. For example, the first stream may be from a pit used to accumulate liquid sulfur from a Claus sulfur recovery plant. The first stream may be heated or cooled to a temperature range from about 250° F. to about 300° F., or to a range of about 265° F. to about 285° F. prior to being pumped into the reactor 100. The temperature range may be established to avoid a sharp increase in viscosity of liquid sulfur which occurs at about 305° F. The flow of the first stream is controlled with a liquid level monitor 108 to maintain the retained catalyst structure in a submerged configuration. Upon the liquid level monitor indicating that the structured packing is at or near a configuration of incomplete submergence, the flow of the first stream may be increased. The flow is also controlled to provide a preselected residence time in the reactor 100, to achieve a desired level of polysulfides removal from the first stream, and/or to achieve a desired level of hydrogen sulfide gas removal from the first stream.

As shown in FIG. 1, the second inlet 104 for the second stream of gas is positioned at the bottom of the reactor 100. However, alternate inlet positioning may be used. The second stream is an inert gas or a low oxygen-containing gas. Suitable gases for the second stream may include, but are not limited to, nitrogen, carbon dioxide, argon, helium or combinations thereof. In addition, second stream may include a small amount of oxygen. For example, the second stream may be a low oxygen-containing gas containing less than about 15 vol % oxygen. It can be obtained, for example, by mixing a suitable inert gas described above with a small amount of air. In one embodiment, the second stream is substantially devoid of oxygen. In one embodiment, the second stream is heated from about 150° F. to about 250° F. prior to being introduced into the reactor 100. The flow rate of the second stream at the second inlet 104 may be established based upon the flow rate of the first stream and/or operating pressure in the reactor 100. While any suitable molar ratio of first to second stream can be employed, typically the ratio will range from about 10 to about 60, typically from about 20 to about 50. Normally the liquid sulfur will be introduced into the reactor at a location above or higher than the inert or low oxygen-containing stream.

In one embodiment, the flow rate of the second stream is selected to provide intimate mixing of the first stream and the second stream. In another embodiment, the flow rate of the second stream is selected to strip and remove dissolved hydrogen sulfide from the first stream including hydrogen sulfide produced by decomposing polysulfides present in the liquid sulfur by the catalyst.

The region 106 for contacting the first stream and the second stream may be a retained catalyst structure, positioned between the first inlet and the second inlet. As used herein, the term "retained catalyst structure" is a catalyst material affixed, coated, trapped or otherwise supported such that movement of the catalyst is limited. Such limited movement provides greater contact between the first stream, the second stream and the catalyst material than an unsupported catalyst. In addition, the limited movement of the catalyst permits contact during concurrent and/or countercurrent flow. In a vertical reactor, region 106 may be positioned in about the middle of the reactor with the first inlet positioned at the top of the reactor and the second inlet positioned at the bottom of the reactor. The stripped hydrogen sulfide gas may be removed via outlet 112 at the top of the reactor along with the second stream of inert gas or low oxygen-containing gas. The overhead inert gas steam or low oxygen-containing gas stream may be recycled back to the Claus reactor using a blower or educator if its operating pressure is lower than the Claus reactor. The recovered inert gas steam or low oxygen-containing gas stream may also be recycled back to the degassing reactor using a blower.

In the region 106 containing the retained catalyst structure, the catalyst decomposes polysulfides present in the first stream into hydrogen sulfide and facilitates removal of the hydrogen sulfide thus produced and dissolved hydrogen sulfide from the liquid sulfur. In an embodiment of the present disclosure, the first stream including liquid sulfur contacts the retained catalyst structure in or around a structured packing. As used here, the term "structured packing" refers to a static physical arrangement of structures or features that facilitates or enhances liquid to gas contact during countercurrent flow and/or concurrent flow. Use of the retained catalyst structure promotes decomposition of polysulfides to hydrogen sulfide and facilitates removal of hydrogen sulfide.

Figure 2:
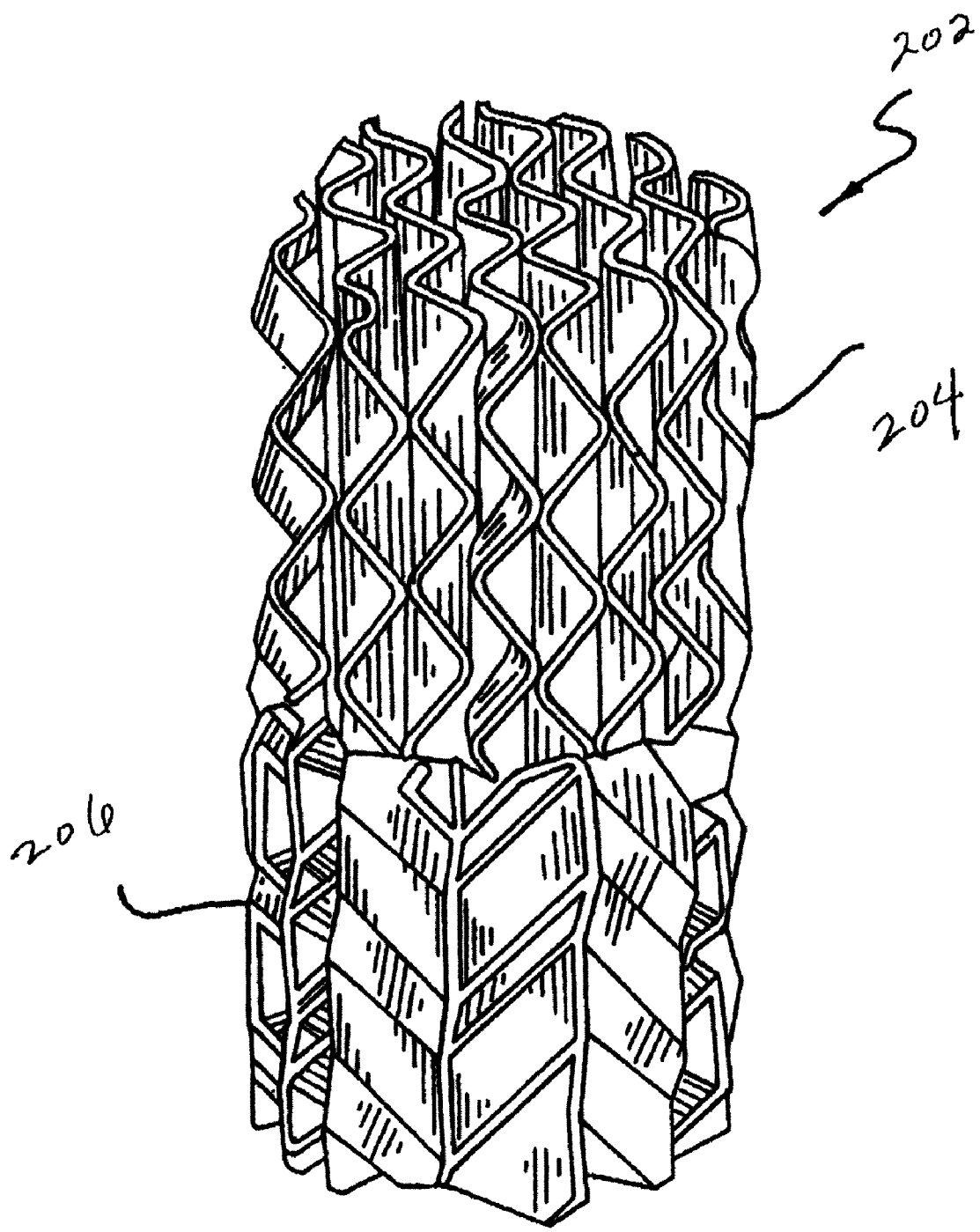
FIG. 2 shows an exemplary structured packing according to an embodiment of the disclosure.

Positioning the retained catalyst structure in region 106 for contacting the first stream and the second stream can permit the combined polysulfides and hydrogen sulfide levels to be lower (for example, less than about 10 ppmw, less than about 5 ppmw, or less than 1 ppmw). FIG. 2 shows an exemplary embodiment of a retained catalyst structure where a structured packing 202 within region 106 is coated with a catalyst material 204. In another embodiment, the retained catalyst structure may be positioned in region 106 by the structured packing being at least partially formed of the catalyst. In another embodiment, the retained catalyst structure may be positioned in region 106 by the structured packing securing the catalyst material (for example, in a cage). The positioning of the retained catalyst structure within region 106 may reduce pressure drop in comparison to a pressure drop associated with a packed bed having spherical or pelletized catalyst. In addition, positioning the retained catalyst structure in region 106 for contacting the first stream and the second stream can accelerate decomposition of polysulfides and facilitate removal of hydrogen sulfide and eventually permit the reactor to be a smaller size.

In the embodiment shown in FIG. 2, the retained catalyst structure 202 includes texture, surface features and/or configuration of catalyst material 204 coated on structured packing that may increase the surface area of catalyst material 204, thereby improving decomposition of polysulfides and facilitate removal of hydrogen sulfide, and/or may improve mixing of the first stream and the second stream by increasing the complexity of the surface of structured packing. Thus, the coated structured packing may accelerate the decomposition of polysulfides and facilitate removal of hydrogen sulfide thus produced and the removal of dissolved hydrogen sulfide from the liquid sulfur.

In one embodiment, the retained catalyst structure 202 may form or be attached to structured packing. The structured packing may be formed of any suitable material. For example, the structured packing may be formed of a ceramic material, for example KATAPAK-K or KATAPAK-M from Sulzer Chemtech, USA. In one embodiment, the ceramic material can be made of bauxite, activated alumina (aluminum oxide), titania (titanium oxide or dioxide), iron oxide or a mixture of alumina, iron oxide and titania. In this embodiment, a base material making up the retained catalyst structure acts as the catalyst for decomposition of the polysulfides and facilitates removal of $H_2S$ and no further coating of the structure is performed. Thus, in the embodiment, the retained catalyst structure 202 is a structured packing that may be substantially devoid of a catalyst material coating. In another embodiment, the retained catalyst structure 202 is a structured packing that includes catalyst material and may further include a catalyst coating for providing desired decomposition of polysulfides.

Additionally or alternatively, the retained catalyst structure 202 may be a suitable metal material structured packing. For example, the structured packing may be formed of stainless steel, carbon steel, Monel, Hastelloy, titanium, nickel, high-nickel alloys, and/or aluminum containing alloys. The metal may contain small or trace amounts of one or more other metals including, but not limited to molybdenum, silicon, niobium, and/or titanium. In one embodiment, the metal may be titanium and a steel composition including iron, aluminum, and chromium such as, for example, FeCrAlloy. In one embodiment, the structured packing is substantially devoid of yellow metals. By substantially free of yellow metals, it is meant that the structured packing contains less than about 1 weight percent of copper. In another embodiment, the metal may be titanium. In the embodiment, the surface of the titanium metal is cleaned by any suitable chemical and/or mechanical treatment to remove impurities, the surface is oxidized by thermal treatment in the presence of an oxygen containing gas to form a layer of titanium dioxide, which will serve as the catalyst for decomposing polysulfides to hydrogen sulfide.

In one embodiment, the retained catalyst structure 202 includes a structured packing having open cross-flow channels. The open cross-flow channels of the structured packing may be made of stacked corrugated sheets with angles varying in a range of about 45 degrees to about 60 degrees. The height of the corrugation in a corrugated sheet (from maximum point to minimum point) may be from about 1 mm to about 6 mm. Thus, including two corrugated sheets may provide an opening from about 2 mm to about 12 mm for the first stream and the second stream to flow through in the cross-flow channels of the structured packing.

The retained catalyst structure 202 may include a structured packing configured to enhance gas holdup in comparison to an empty column. Specifically, at intersection points of the channels, the shear forces caused by having gas and liquid flowing countercurrently split the gas phase into small bubbles, thereby reducing the velocity of gas rising in the reactor. The reduced velocity and tortuous path increase the residence time and mixing of the gas and liquid within the reactor by increasing contact time.

Referring to FIG. 2, structured packing of retained catalyst structure 202 includes a flow pattern for a predetermined flow rate of gas and liquid, a predetermined size of gas bubbles entering the structured packing, and/or a flow opening 206 in the structured packing. For example, when the size of the gas bubbles is larger than flow opening 206 in the structured packing, the bubbles face flow resistance, spend considerable time outside the packing, and/or struggle to enter the structured packing. As shown in FIG. 2, structured packing includes a flow opening 206 slightly larger than the size of the gas bubbles entering structured packing 202. In one embodiment, the flow opening may be about 4 mm and the gas bubbles are slightly smaller than 4 mm. In another embodiment, the structured packing may include a flow opening substantially larger than the size of the gas bubbles entering the structured packing.

In one embodiment, the size of the gas bubbles may be controlled at the second inlet 104 for introducing the second stream of low oxygen or inert gas. For example, as shown in FIG. 3, second inlet 104 may be a gas diffuser 302 or sparger of a preselected shape and size. In one embodiment, the shape may be a circular ring or a star pattern with a number of holes to substantially uniformly distribute the second stream of an inert gas or low oxygen-containing gas into the reactor. In another embodiment, a ladder type distributor may be used. As shown in FIG. 3, the size of openings 304 in gas diffuser 302 corresponds in size to flow opening 206 in structured packing of retained catalyst structure 202. For example, opening 304 in gas diffuser 302 may be about four times smaller than flow opening 206 in structured packing of the retained catalyst structure 202 since the size of gas bubbles emerging out of gas diffuser 302 is generally three to four times larger than the size of opening 304.

In one embodiment, a sintered metal diffuser sparger with about 50 to 150 micron sized pores forms the second inlet 104 for the second stream. The sintered metal diffuser disperses the second stream as fine bubbles in the first stream including liquid sulfur. The sintered metal diffuser sparger improves contact and contact time between the first stream and the second stream in the retained catalyst structure 202. The sintered metal diffuser may be formed of 316L, 304L, 347, or 430 stainless steel, Inconel, Monel 400, Nickel 200, Hastelloy C276, C22 and X, and/or Alloy20 and can be purchased from Mott Corporation of USA.

The catalyst for use in the retained catalyst structure 202 may be any suitable catalyst. In one embodiment, the catalyst may coat a structured packing. For example, the retained catalyst structure 202 may be a structured packing having a material surface coated with a high surface area, porous catalytic material including bauxite (mineral form of titanium dioxide), titania, alumina (thermally stable α-alumina, θ-alumina or dehydrated and thermally stabilized γ-alumina also known as activated alumina), a mixture of silica with alumina, a mixture of silica and titania, or a mixture of alumina and titania, iron oxide and/or combinations thereof. Alumina catalyst material may be stabilized against degradation by heat and moisture with the use of materials such as zirconia, titania, and/or rare earth metal oxides (such as ceria, lanthanum oxide, and rare earth oxide mixtures). Likewise, titania catalyst material can be mixed with zirconia, titania, and/or rare earth metal oxides (such as ceria, lanthanum oxide, and rare earth oxide mixtures). Both alumina and titania based catalysts can be promoted with iron oxide and/or alkaline metal oxides such as oxides of sodium, potassium, lithium, calcium, and/or strontium.

As used herein, the term "thermally stabilized alumina" refers to a temperature-stabilized form of alumina that is obtained by subjecting Boehmite, Gibbsite, and/or similar hydrated or activated alumina precursors to an elevated temperature, thereby converting substantially all of the hydrated or activated precursors to more temperature-stable forms of alumina such as γ-alumina. The thermally stabilized γ-alumina may comprise greater than about 80% γ-alumina or greater than about 90% γ-alumina by weight with the remainder being in the forms of alumina such as η, κ-alumina, θ-alumina and α-alumina. The surface area of thermally stabilized γ-alumina in powder form may vary from about 40 $m^2/g$ to about 450 $m^2/g$. Likewise, the surface area of titania powder used for coating the structured packing with titania catalyst may vary from 40 $m^2/g$ to about 450 $m^2/g$. Furthermore, the surface area of silica powder mixed with either activated alumina and/or titania may vary from 40 $m^2/g$ to about 450 $m^2/g$.

Low surface area, thermally stabilized alumina in the form of θ-alumina and α-alumina can also be used for coating the structured packing. They are obtained by subjecting Boehmite, γ-alumina, or similar hydrated or activated alumina precursors to an elevated temperature, thereby converting substantially all of the hydrated or activated precursors to more temperature-stable forms of alumina such as, for example, θ-alumina and α-alumina. Typically, thermally stabilized alumina comprises greater than about 50% θ-alumina or α-alumina, and normally greater than about 75% θ-alumina or α-alumina. The remainder of the thermally stabilized alumina may comprise other forms of alumina such as, for example, α-, γ-, η, and κ-alumina. The surface area of thermally stabilized θ-alumina in powder form may vary from about 20 $m^2/g$ to about 100 $m^2/g$. Likewise, the surface area of α-alumina in powder form may vary from about 5 $m^2/g$ to about 40 $m^2/g$.

The application of catalytic material on the surface of structured packing material to form the retained catalyst structure 202 may include (a) preparing a flowable aqueous slurry using the desired coating material, (b) contacting the structured packing material with the aqueous slurry to form a coating, and (c) calcining the coated material at a temperature of from 300° C. to 1,000° C. to form the coated structured packing retained catalyst structure 202.

The aqueous slurry can be prepared by charging the desired amount of water and selected catalytic material along with various additives and promoters and mixing all the ingredients thoroughly. A ball mill with zirconia or ceramic balls as the grinding/mixing medium or other known techniques can be used for preparing the slurry. It may optionally be desirable to adjust pH of the aqueous slurry to below about 5 to facilitate good adhesion of coating on the metallic and ceramic surface of structured packing material. The acidity may be provided by the use of a minor amount of a water-soluble organic or inorganic acid such as, for example, hydrochloric or nitric acid, or a lower fatty acid such as acetic acid. The concentration of selected catalytic material by dry weight in the slurry may range from about 2 wt. % to about 30 wt. %, or from about 5 wt. % to about 20 wt. %.

In one embodiment, the aqueous slurry for coating the structure packing with titania to form the retained catalyst structure 202 can be prepared by (1) mixing thoroughly titania powder and water and optionally an acid, (2) coating the structured packing with the slurry using a suitable technique, (3) drying the coating in air, and (4) calcining at a temperature varying from 300° C. to 1000° C. for a suitable amount of time. A technique such as dipping the structured packing into the slurry or spraying slurry onto the structure can be used to coat the structure. The coating can be dried by heating in air to a temperature varying from 120° C. to 150° C. for 5 minutes to several hours. Calcining of coating can be carried out by heating the coated structure to the desired temperature in the presence of air for 15 minutes to several hours. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final titania coating. Furthermore, a small amount of hydrated alumina in the form Boehmite can be added to the slurry to act as a binder for the titania coating. The hydrated alumina will transform into activated alumina during the calcination of the coating.

In another embodiment, the aqueous slurry for coating the structure with activated alumina to form the retained catalyst structure 202 can be prepared by (1) mixing thoroughly γ-alumina powder and water and optionally an acid, (2) coating structure with the slurry using a suitable technique, (3) drying the coating in air, and (4) calcining at a temperature varying from 300° C. to 700° C. for a suitable amount of time. The coating can be dried by heating in air to a temperature varying from 120° C. to 150° C. for 5 minutes to several hours. Calcining of coating again can be carried out by heating the coated structure to the desired temperature in the presence of air for 15 minutes to several hours. A technique such as dipping the structure into the slurry or spraying slurry onto the structure can be used to coat the structure. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final activated alumina coating. Furthermore, a small amount of hydrated alumina in the form Boehmite can be added to the slurry to act as a binder for the activated alumina coating. The hydrated alumina will transform into activated alumina during the calcination of the coating.

In another embodiment, the aqueous slurry for coating the structure with activated alumina to form the retained catalyst structure 202 can be prepared by (1) mixing thoroughly θ-alumina or α-alumina powder and water and optionally an acid, (2) coating structure with the slurry using a suitable technique, (3) drying the coating in air, and (4) calcining at a temperature varying from 300° C. to 1,000° C. for a suitable amount of time. The coating can be dried by heating in air to a temperature varying from 120° C. to 150° C. for 5 minutes to several hours. Calcining of coating again can be carried out by heating the coated structure to the desired temperature in the presence of air for 15 minutes to several hours. A technique such as dipping the structure into the slurry or spraying slurry onto the structure can be used to coat the structure. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final activated alumina coating. Furthermore, a small amount of hydrated alumina in the form Boehmite can be added to the slurry to act as a binder for the activated alumina coating. The hydrated alumina will transform into activated alumina during the calcination of the coating.

In another embodiment, the aqueous slurry for coating the structure with a mixture of titania and activated alumina to form the retained catalyst structure 202 can be prepared by (1) mixing thoroughly titania and γ-alumina powders and water and optionally an acid, (2) coating structure with the slurry using a suitable technique, (3) drying the coating in air, and (4) calcining at a temperature varying from 300° C. to 1000° C. for a suitable amount of time. A technique such as dipping the structure into the slurry or spraying slurry onto the structure can be used to coat the structure. The coating can be dried by heating in air to a temperature varying from 120° C. to 150° C. for 5 minutes to several hours. Calcining of coating then can be carried out by heating the coated structure to the desired temperature in the presence of air for 15 minutes to several hours. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final titania/activated alumina coating. Furthermore, a small amount of hydrated alumina in the form Boehmite can be added to the slurry to act as a binder for the titania/activated alumina coating. The hydrated alumina will transform into activated alumina during the calcination of the coating. The proportion of titania in the final titania-activated alumina coating may vary from 20% to 80% by weight. Likewise the proportion of activated alumina in the final titania-activated alumina coating may vary from 20% to 80% by weight.

In another embodiment, the aqueous slurry for coating the structure with a mixture of titania and θ-alumina or α-alumina to form the retained catalyst structure 202 can be prepared by (1) mixing thoroughly titania and θ-alumina or α-alumina powders and water and optionally an acid, (2) coating structure with the slurry using a suitable technique, (3) drying the coating in air, and (4) calcining at a temperature varying from 300° C. to 1000° C. for a suitable amount of time. A technique such as dipping the structure into the slurry or spraying slurry onto the structure can be used to coat the structure. The coating can be dried by heating in air to a temperature varying from 120° C. to 150° C. for 5 minutes to several hours. Calcining of coating then can be carried out by heating the coated structure to the desired temperature in the presence of air for 15 minutes to several hours. Repeated cycles of applying slurry followed by drying slurry can be used to build up the desired coating thickness. A small amount of colloidal zirconia can optionally be added to the slurry to enhance adhesion of the coating on the structure. A small amount of silica and/or rare earth metal oxide can optionally be added to the slurry to improve thermal stability of the coating. A small amount of activating agents such as iron oxide and/or alkaline metal oxide can optionally be added to the slurry to activate the final titania/θ-alumina or α-alumina coating. Furthermore, a small amount of hydrated alumina in the form Boehmite can be added to the slurry to act as a binder for the titania/θ-alumina or α-alumina coating. The hydrated alumina will transform into activated alumina during the calcination of the coating. The proportion of titania in the final titania-θ-alumina or α-alumina coating may vary from 20% to 80% by weight. Likewise the proportion of activated alumina in the final titania-θ-alumina or α-alumina coating may vary from 20% to 80% by weight.

As mentioned above, any suitable method may be employed to coat the surface of structured packing material with the aqueous slurry. Such methods may include painting, brushing, spraying, dipping, and flow-coating.

The amount of titania in the final titania-based coating may vary from about 90% to about 98% by weight. The amount of silica and/or zirconia in the final titania-based coating may vary from about 0% to about 10% by weight. The amount of rare earth oxide in the final titania-based coating may vary from about 0 to 10% by weight. The amount of iron oxide and/or alkaline metal oxide in the final titania-based coating may vary from about 0 to 5% by weight.

The amount of activated alumina, θ-alumina or α-alumina in the final alumina-based coating may vary from about 90% to about 98% by weight. The amount of silica and/or zirconia in the final alumina-based coating may vary from about 0% to about 5% by weight. The amount of rare earth oxide in the final alumina-based coating may vary from about 0% to 5% by weight. The amount of iron oxide and/or alkaline metal oxide in the final alumina-based coating may vary from about 0 to 5% by weight.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A reactor, comprising:
   a first inlet for a first stream including liquid sulfur containing polysulfides and dissolved hydrogen sulfide;
   a second inlet for a second stream of an inert gas or a low oxygen containing gas;
   a retained catalyst structure arranged and disposed to facilitate contact between the first stream, the second stream, and the retained catalyst structure;
   the retained catalyst structure having a catalyst material affixed, coated, trapped, or supported such that movement of the catalyst is limited; and
   wherein the amount of catalyst is sufficient to increase the rate of decomposition of the polysulfides and facilitate removal of hydrogen sulfide produced by decomposing polysulfides and hydrogen sulfide present in the liquid sulfur of the first stream with the second stream, thereby decreasing total polysulfides and hydrogen sulfide content in the liquid sulfur to less than 5 ppmw.

2. The reactor of claim 1, wherein the retained catalyst structure is positioned between the first inlet and the second inlet.

3. The reactor of claim 1, wherein the second inlet includes apertures corresponding in size to flow openings in the retained catalyst structure.

4. The reactor of claim 1, wherein flow of the first stream through the first inlet is controlled to provide a preselected residence time in the reactor, to achieve a desired level of polysulfides removal from the first stream, and to achieve a desired level of hydrogen sulfide gas removal from the first stream.

5. The reactor of claim 1, wherein the retained catalyst structure is a catalyst coated on a structured packing.

6. The reactor of claim 1, wherein the retained catalyst structure is a catalyst formed into a structured packing.

7. The reactor of claim 1, wherein the retained catalyst structure is a catalyst secured by a structured packing.

8. The reactor of claim 1, wherein the retained catalyst structure includes a catalyst selected from the group consisting of bauxite, titania, alumina, a mixture of silica with thermally stable alumina, a mixture of silica, and titania, and combinations thereof.

9. The reactor of claim 8, wherein the retained catalyst structure is promoted with iron oxide or alkaline metal oxide.

10. A structured packing for contacting a first stream and a second stream in a reactor, the structured packing comprising:
    a retained catalyst structure;
    the retained catalyst structure having a catalyst material affixed, coated, trapped, or supported such that movement of the catalyst is limited and whereby the retained catalyst structure increases the rate of decomposition of the polysulfides and facilitates the removal of hydrogen sulfide produced by decomposing polysulfides and hydrogen sulfide present in the liquid sulfur of the first stream with the second stream, thereby decreasing total polysulfides and hydrogen sulfide content in the liquid sulfur to less than 5 ppmw;

wherein the first stream includes liquid sulfur containing polysulfides and dissolved hydrogen sulfide, and wherein the second stream includes an inert gas or a low oxygen-containing gas.

11. The structured packing of claim 10, wherein the retained catalyst structure includes a flow opening corresponding in size to an opening in the second inlet.

12. The structured packing of claim 10, wherein the retained catalyst structure is a catalyst coated on a structured packing.

13. The structured packing of claim 10, wherein the retained catalyst structure is a catalyst formed into a structured packing.

14. The structured packing of claim 10, wherein the retained catalyst structure is a catalyst secured by a structured packing.

15. The structured packing of claim 10, wherein the retained catalyst structure includes a catalyst selected from the group consisting of bauxite, titania, alumina, a mixture of silica with thermally stable alumina, a mixture of silica and titania, and combinations thereof.

16. The structured packing of claim 15, wherein the catalyst is promoted with iron oxide or alkaline metal oxide.

17. A method of treating hydrogen sulfide and polysulfides in liquid sulfur, the method comprising:

providing a first stream including liquid sulfur containing polysulfides and hydrogen sulfide;

providing a second stream of an inert gas or a low oxygen-containing gas; and in a retained catalyst structure, contacting the first stream and the second stream, the retained catalyst structure having a catalyst material affixed, coated, trapped, or supported such that movement of the catalyst is limited; and wherein the catalyst is sufficient to increase the rate of decomposition of polysulfides to hydrogen sulfide and facilitate the removal of hydrogen sulfide thus produced and hydrogen sulfide present in the liquid sulfur of the first stream with the second stream, thereby decreasing total polysulfides and hydrogen sulfide content in the liquid sulfur to less than 5 ppmw.

18. The method of claim 17, wherein the second inlet includes an opening corresponding in size to a flow opening in the retained catalyst structure.

19. The method of claim 17, further comprising adjusting flow of the first stream through the first inlet to provide a preselected residence time in the reactor, to achieve a desired level of polysulfides removal from the first stream, and to achieve a desired level of hydrogen sulfide gas removal from the first stream.

20. The method of claim 17, wherein the retained catalyst structure is a catalyst coated on a structured packing.

21. The method of claim 17, wherein the retained catalyst structure is a catalyst formed into a structured packing.

22. The method of claim 17, wherein the retained catalyst structure is a catalyst secured by a structured packing.

23. The method of claim 17 wherein the second stream contacts a distributor.

24. The method of claim 23 wherein the distributor comprises a metal sparger diffuser.

* * * * *